US008964691B2

(12) United States Patent
Chen

(10) Patent No.: US 8,964,691 B2
(45) Date of Patent: Feb. 24, 2015

(54) METHOD AND APPARATUS FOR INTER-TECHNOLOGY HANDOFF OF A USER EQUIPMENT

(75) Inventor: Bonnie Chen, Grapevine, TX (US)

(73) Assignee: Google Technology Holdings LLC, Mountain View, CA (US)

(*) Notice: Subject to any disclaimer, the term of this patent is extended or adjusted under 35 U.S.C. 154(b) by 1091 days.

(21) Appl. No.: 12/511,562

(22) Filed: Jul. 29, 2009

(65) Prior Publication Data
US 2010/0040020 A1 Feb. 18, 2010

Related U.S. Application Data

(60) Provisional application No. 61/089,607, filed on Aug. 18, 2008.

(51) Int. Cl.
H04W 36/00 (2009.01)
H04W 80/10 (2009.01)

(52) U.S. Cl.
CPC ...... H04W 36/0022 (2013.01); H04W 36/0033 (2013.01); H04W 80/10 (2013.01)
USPC .......................... 370/331; 455/432.1; 455/443

(58) Field of Classification Search
USPC .............. 370/310.2, 328–339, 349, 352–356; 455/422.1, 432.1, 436–444
See application file for complete search history.

(56) References Cited

U.S. PATENT DOCUMENTS

| 2008/0026752 | A1* | 1/2008 | Flore et al. ................. 455/435.2 |
| 2009/0270099 | A1* | 10/2009 | Gallagher et al. ......... 455/435.1 |
| 2010/0034168 | A1* | 2/2010 | Mahdi ........................... 370/331 |
| 2010/0165948 | A1* | 7/2010 | Ore et al. ...................... 370/331 |
| 2010/0260105 | A1* | 10/2010 | Keller et al. .................. 370/328 |
| 2011/0013597 | A1* | 1/2011 | Hwang et al. ................. 370/331 |
| 2011/0051691 | A1* | 3/2011 | Hietalahti et al. ............ 370/331 |
| 2012/0014356 | A1* | 1/2012 | Mutikainen et al. .......... 370/331 |
| 2012/0039303 | A1* | 2/2012 | Stenfelt et al. ................ 370/331 |

OTHER PUBLICATIONS

3GPP TS 23.216 v8.0.0 (Jun. 2008); 3rd Generation Partnership Project; Technical Specification Group Services and System Aspects; Single Radio Voice Call Continuity (SRVCC); Stage 2 (Release 8), Jun. 2008, 3GPP.*

* cited by examiner

Primary Examiner — Hoon J Chung
(74) Attorney, Agent, or Firm — Faegre Baker Daniels LLP

(57) ABSTRACT

A communication system is provided that implements an inter-technology SRVCC handoff without the need for an SRVCC indicator. A user equipment (UE) establishes a communication session that comprises a voice component in a packet data network. In response to determining to handoff the session to a target network, the communication system determines that the session comprises a voice component based on a call-type identifier, preferably a QoS Class Identifier (QCI), that is associated with a voice call and further determines that a target network is a circuit switched network based on configuration information maintained in association with the target network. In response to determining that the session comprises a voice component, that the target network is a circuit switched network, and, based on a profile of the UE, that the UE is capable of operation in single radio mode, the communication system determines to implement a SRVCC handoff procedure.

18 Claims, 4 Drawing Sheets

102:

124:

METHOD AND APPARATUS FOR INTER-TECHNOLOGY HANDOFF OF A USER EQUIPMENT

CROSS-REFERENCE TO RELATED APPLICATION

This application claims priority from provisional application Ser. No. 61/089,607, entitled "METHOD AND APPARATUS FOR INTER-TECHNOLOGY HANDOFF OF A USER EQUIPMENT," and filed Aug. 18, 2008, which is commonly owned and incorporated herein by reference in its entirety.

FIELD OF THE INVENTION

The present invention relates generally to wireless communication systems, and more specifically to handover of a user equipment between wireless communication networks implementing different air interface technologies.

BACKGROUND OF THE INVENTION

The evolution of wireless communications has resulted in a proliferation of networks of different technologies and corresponding different air interfaces. As a result, during the course of a call, a wireless user equipment (UE) may roam among multiple radio access networks (RANs), wherein each such RAN implements a different technology than the other RANs of the multiple RANs, for example, a second generation (2G) or third generation (3G) RAN, such as a GSM (Global System for Mobile communications) RAN, a GSM/EDGE Radio Access Network (GERAN), or a UMTS Terrestrial Radio Access Network (UTRAN), that may provide primarily circuit switched voice service, and a packet data RAN, such as a later generation 3GPP LTE (Third Generation Partnership Project Long Term Evolution) network, a 3GPP2 UMB (Third Generation Partnership Project 2 Ultra Mobile Broadband) network, a WiMAX network, or a Wireless Fidelity network based on IEEE 802 standards, providing packet data Voice over Internet Protocol (VoIP) and other data related services.

The 3GPP specifications (TS 23.216) permit a UE that is engaged in a communication session via a packet data RAN and that includes a voice component, which session is anchored in an IP Multimedia Subsystem (IMS) and more particularly at a Voice Call Continuity Application Server of the IMS, to handoff the voice component from the packet data RAN to a circuit switched RAN while the call remains anchored in IMS. When the UE is a multi-radio UE that is capable of concurrent operation in both the source network and the target network, it may be possible to implement a soft handover wherein the UE exchanges bearer content with both networks in parallel during the handover. However, if the UE is a single radio UE that is capable of operation in only a single technology at any given time, then a soft handover is not possible. Currently, a scheme proposed in the 3GPP specifications for determining, by a network, whether to invoke a single radio-type handover procedure requires a single radio, SRVCC indicator to be sent to the network to invoke a single radio-type handover procedure when handing off from a packet data network to a circuit switched network. However, sending such an indicator consumes bandwidth and requires changes to the standards and software redesigns.

Therefore, a need exists for a method and apparatus for determining whether to invoke a single radio-type handover procedure when handing off a voice component of a communication session from a packet data network to a circuit switched network.

DETAILED DESCRIPTION OF THE INVENTION

Figure 1:
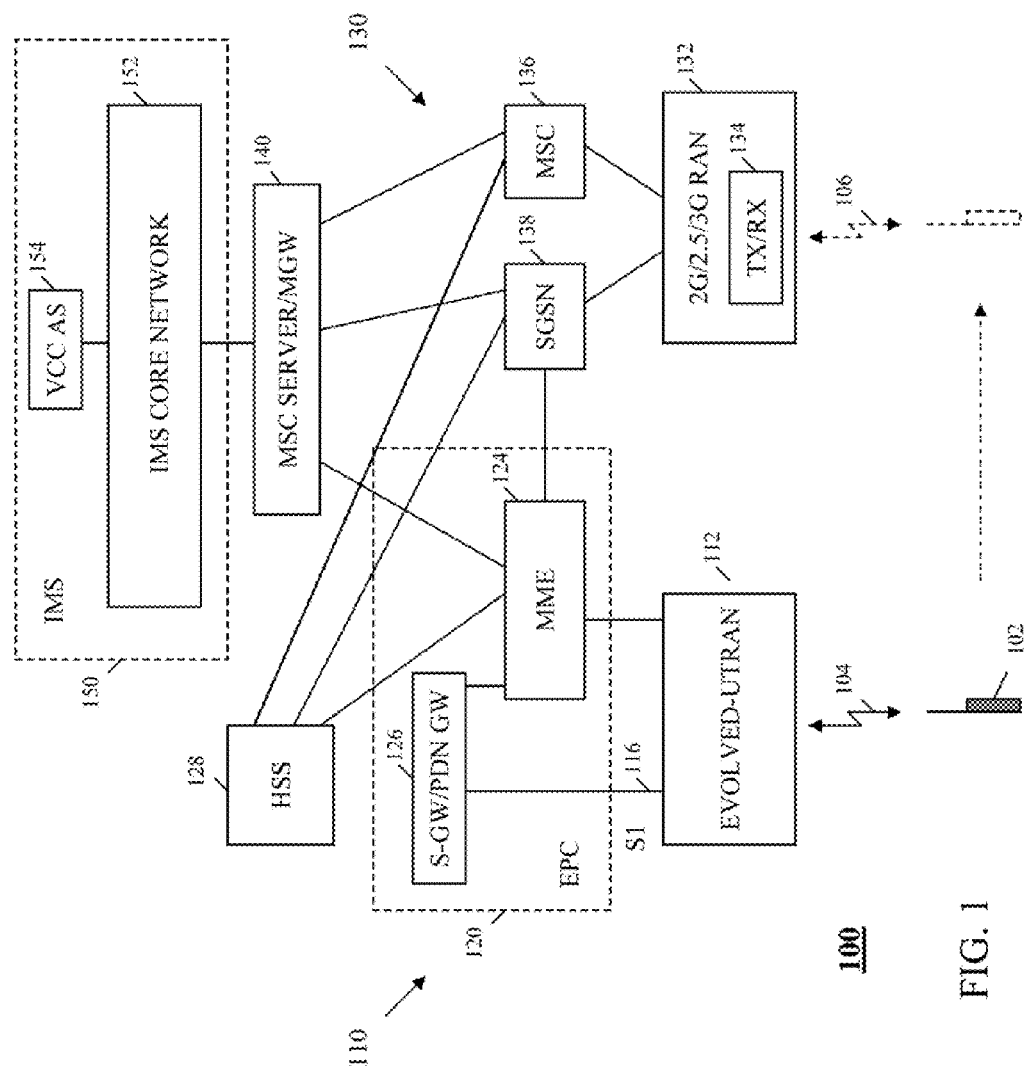
FIG. 1 is a block diagram of a wireless communication system in accordance with various embodiments of the present invention.

To address the need that exists for a method and apparatus for determining whether to invoke a single radio-type handover procedure when handing off a voice component of a communication session from a packet data network to a circuit switched network, a communication system is provided that implements an inter-technology, Single Radio Voice Call Continuity (SRVCC) handoff without the need for an SRVCC indicator. A user equipment (UE) establishes a communication session that comprises a voice component in a packet data network. In response to determining to handoff the communication session to a target network, the communication system determines that the communication session comprises a voice component based on a call-type identifier, preferably a QoS (Quality of Service) Class Identifier (QCI), that is associated with a voice call and further determines that a target network is a circuit switched network based on configuration information maintained in association with the target network. In response to determining that the communication session comprises a voice component, that the target network is a circuit switched network, and, based on a profile of the UE, that the UE is capable of operation in single radio mode, the communication system determines to implement a SRVCC handoff procedure.

Generally, an embodiment of the present invention encompasses a method for implementation of an inter-technology handoff of a communication session from a packet data network to a circuit switched network. The method includes establishing, in a packet data network and with a UE, a communication session that comprises a voice component and determining to hand off the communication session. The method further includes, in response to determining to hand off the communication session and based on a call-type identifier, determining that the communication session comprises a voice component, and determining that a target network is a circuit switched network based on configuration information maintained in association with the target network. The method further includes, in response to determining that the communication session comprises a voice component, that the target network is a circuit switched network, and that the UE is capable of operation in single radio mode, determining to implement a SRVCC handoff procedure.

Another embodiment of the present invention encompasses an apparatus that provides for inter-technology handoff of services from a packet data network to a circuit switched network. The apparatus includes an at least one memory device that maintains configuration information in association with the circuit switched network. The apparatus further includes a processor that is configured to establish, in a packet data network and with a UE, a communication session that comprises a voice component, determine that the communication session comprises a voice component based on a call-type identifier, determine that a target network of a handoff of the UE is a circuit switched network based on the maintained configuration information, and in response to determining that the communication session comprises a voice component, that the target network is a circuit switched network, and that the UE is capable of operation in single radio mode, determining to implement a SRVCC handoff procedure.

Turning now to the drawings, the present invention may be more fully described with reference to FIGS. 1-4B. FIG. 1 is a block diagram of a wireless communication system 100 in accordance with various embodiments of the present invention. Communication system 100 includes a first, fourth generation (4G), evolved packet data wireless network 110 that provides packet data voice service and a second wireless network 130 that provides primarily circuit switched voice service, such as a 2G (second generation), 2.5G, or 3G (third generation) wireless network. Network 110 includes a first Radio Access Network (RAN) 112 that provides wireless communications services to users' equipment (UEs) residing in a coverage area of the first RAN. RAN 112 is an E-UTRAN (Evolved Universal Terrestrial Radio Access Network) and comprises an evolved Node B (eNode B). Network 110 further includes an Evolved Packet Core (EPC) 120 that comprises a Mobility Management Entity (MME) 124 and a Gateway 126 that each are coupled to E-UTRAN 112 and to each other. Preferably, Gateway 126 comprises one or more of a Serving Gateway (S-GW) and a Packet Data Network Gateway (PDN GW) and is coupled to E-UTRAN 112 via an S1 interface 116. MME 124 further is coupled to a Home Subscriber Server (HSS) 128 for retrieving, among other information, Voice Call Continuity Application Server (VCC AS) information from the HSS.

Network 130 includes a second RAN 132, for example, a GSM RAN, a GSM/EDGE Radio Access Network (GERAN), or a UMTS Terrestrial Radio Access Network (UTRAN). RAN 132 comprises a transceiver, such a second Node B, an Access Point (AP), or a Base Station Transceiver (BTS), 134 that provides wireless communications services to UEs residing in a coverage area of the second RAN. Second RAN 132 may or may not further include a controller (not shown), such as a Radio Network Controller (RNC) or a Base Station Controller (BSC), coupled to the transceiver. Network 130 further includes a Mobile Switching Center (MSC) 136 and a Serving GPRS Support Node (SGSN) 138 that each are coupled to RAN 132 and to HSS 128 and which MSC supports Single Radio Voice Call Continuity (SRVCC). SGSN 138 further is coupled to MME 124 of 4G network 110.

Each of networks 110 and 130, and more particularly MME 124, MSC 136, and SGSN 138, is coupled to an IP Multimedia Subsystem (IMS) network 150 via a MSC Server/Media Gateway (MGW) 140. In various embodiments of the present invention, MSC Server/MGW 140 may be co-located or may reside in separate network entities that are in communication with each other. IMS network 150 includes an IMS core network 152 that includes network entities such as a Call Session Control Function (CSCF) (not shown), and further includes multiple application servers, including a Voice Call Continuity Application Server (VCC AS) 154, that are accessible via the IMS core network. Gateway 126 may be further coupled to HSS 128 via the CSCF of the IMS core network. MSC Server/MGW 140 provides interworking functionality between MSC 136 and MME 124/IMS network 150, converting packet data network 110 messages, such as 4G messages received MME 124 to circuit switched network 130 messages, such as 2G/2.5G/3G messages, that can be understood by MSC 136 and converting circuit switched network 130 messages from MSC 136 to packet data network 110 messages for MME 124. For example, when a user equipment (UE) is engaged in a voice call with network 130 that is anchored in IMS network 150, MCS Server/MGW 140 may convert Pulse Code Modulation (PCM) signals received from MSC 136 to data packets, for example, based on a Real Time Protocol/User Datagram Protocol/Internet Protocol (RTP/UDP/IP) protocol suite, for routing to MME 124 or in the IMS network 150 and may convert voice data received from the MME or IMS network to a PCM over TDM (Time Division Multiplex) format for routing to MSC 136.

Communication system 100 further includes a user equipment (UE) 102 that is configured to operate in a single radio technology, or mode, for wireless applications/services, for example but not limited to a cellular telephone, a radiotelephone, or a Personal Digital Assistant (PDA), personal computer (PC), or laptop computer equipped for wireless communications. UE 102 is capable of engaging in a communication session involving a voice component with each of networks 110 and 130, and more particularly is capable of communicating with E-UTRAN 112 of network 110, preferably via the 3GPP LTE (Third Generation Partnership Project Long Term Evolution) protocol, and with RAN 132 of network 130, preferably via the GSM (Global System for Mobile communications) protocol or a later generation (2.5G or 3G) version of the GSM protocol, such as the General Packet Radio Service (GPRS) protocol or the Universal Mobile Telecommunications System (UMTS) protocol.

Each of E-UTRAN 112 and RAN 132 provides wireless communication services to users equipment (UEs) located in a coverage area of the RAN via a respective air interface 104, 106. Each air interface 104, 106 includes a forward link that includes a pilot channel, at least one forward link traffic channel, and a forward link common and dedicated signaling channels. Each air interface 104, 106 further includes an reverse link that includes at least one reverse link traffic channel, reverse link common and dedicated signaling channels, and an access channel. Together, E-UTRAN 112 and RAN 132, EPC 120, MSC 136, SGSN 138, HSS 128, MSC Server/MGW 140, and IMS network 150 collectively may be referred to herein as an infrastructure of communication system 100, and each of E-UTRAN (also referred as an eNode B) 112, MME 124, S-GW/PDN GW 126, HSS 128, transceiver 134, MSC 136, SGSN 138, MSC Server/MGW 140 and VCC AS 154 may be referred as a network element of communication system 100.

Figure 2:
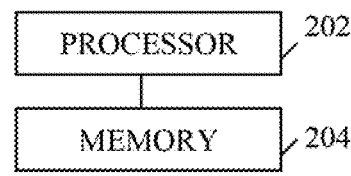
FIG. 2 is a block diagram of a user equipment of FIG. 1 in accordance with an embodiment of the present invention.

Referring now to FIG. 2, an architecture of UE 102 is provided in accordance with an embodiment of the present invention. UE 102 includes a processor 202, such as one or more microprocessors, microcontrollers, digital signal processors (DSPs), combinations thereof or such other devices known to those having ordinary skill in the art, which processor is configured to execute the functions described herein as being executed by UE 102. UE 102 further includes an at least one memory device 204, such as random access memory (RAM), dynamic random access memory (DRAM), and/or read only memory (ROM) or equivalents thereof, that is coupled to the processor and that maintains data and programs that may be executed by the associated processor and that allows the UE to perform all functions necessary to operate in communication system 100. UE 102 may maintain preprogrammed information in the at least one memory device 204 that facilitates an operation in, and a switching between, networks 110 and 130.

Figure 3:
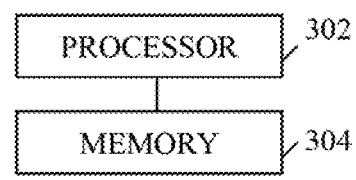
FIG. 3 is a block diagram of a Mobility Management Entity of FIG. 1 in accordance with an embodiment of the present invention.

FIG. 3 is an architecture of MME 124 in accordance with an embodiment of the present invention. The MME include a processor 302, such as one or more microprocessors, microcontrollers, digital signal processors (DSPs), combinations thereof or such other devices known to those having ordinary skill in the art, which processor is configured to execute the functions described herein as being executed by the MME. The MME further include an at least one memory device 304 that may comprise random access memory (RAM), dynamic random access memory (DRAM), and/or read only memory (ROM) or equivalents thereof, that maintain data and programs that may be executed by the associated processor and that allow the MME to perform all functions necessary to operate in communication system 100.

At least one memory device 304 further maintains configuration information for each neighboring MSC and MSC Server, such as MSC Server 140, for facilitating handoffs to or from such MSCs. For example, such configuration information may include routing information for the MSC, protocols supported by the MSC, such as whether the MSC supports circuit switched voice calls and Single Radio Voice Call Continuity (SRVCC), and identifiers of the RANs, and/or of the transceivers and/or controllers included in the RANs, supported by the MSC, such as an identifiers of RAN 132 and/or transceiver 134 supported by MSC 136. At least one memory device 304 further maintains a profile for each UE, such as UE 102, served by the MME, which profile includes the capabilities, such as single radio capabilities, of the UE. For example, when a UE registers with, that is, attaches to, network 110, the UE may convey its capabilities to MME 124 or the MME may retrieve the UE's capabilities from HSS 128 or from a Home Location Register (HLR) or Visited Location Register (VLR) that maintains such information.

The functionality described herein as being performed by UE 102 and MME 124 is implemented with or in software programs and instructions stored in the respective at least one memory device 204, 304 associated with the UE and MME and executed by a processor 202, 302 associated with the UE and MME. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the UE and MME. Based on the present disclosure, one skilled in the art will be readily capable of producing and implementing such software and/or hardware without undo experimentation.

In order for UE 102 to engage in a circuit switched voice call or a packet data voice call via circuit switched network 130 or packet data network 110, respectively, each of UE 102, circuit switched network 130, and packet data network 110 operates in accordance with known wireless telecommunications protocols. Circuit switched network 130 preferably is a legacy communication system that provides circuit switched communication services to subscribers serviced by the network (it may also provide packet data services) and that operates in accordance with the GSM standards or later generations of the GSM standards. Packet data network 110, as illustrated herein, is a 3GPP LTE (Third Generation Partnership Project Long Term Evolution), EPS (Evolved Packet System) communication system that provides packet data communication services to subscribers serviced by the network; however, other applicable packet data networks include 3GPP2 UMB (Third Generation Partnership Project 2 Ultra Mobile Broadband) and WiMAX packet data networks. To ensure compatibility, radio system parameters and call processing procedures are specified by the standards, including call processing steps that are executed by an UE and a base station subsystem or other access network serving the UE and between the base station subsystem or other access network and associated infrastructure. However, those of ordinary skill in the art realize that packet data network 110 also may operate in accordance with any one of a variety of wireless packet data communication systems that supports multimedia packet data-based communication sessions, such as the IEEE (Institute of Electrical and Electronics Engineers) 802.xx standards, for example, the 802.11, 802.15, or 802.16 or 802.20 standards, and that circuit switched network 130 may operate in accordance with any one of a variety of well-known legacy wireless telecommunication systems that provide circuit switched communication services.

In communication system 100, when UE 102 is engaged in a communication session that includes a voice component, that is, a voice bearer, with packet data network 110 and which call is anchored in IMS network 150, and in particular at VCC AS 154, the UE may roam through the system. As a result of the roaming, situations may arise where it is desirable to hand off the voice component from packet data network 110 to circuit switched network 130. For example and as is known in the art, while roaming in communication system 100 and being serviced by E-UTRAN 112, UE 102 may receive a stronger signal from RAN 132. Typically signal strengths are determined by a UE, such as UE 102, measuring a pilot channel associated with the E-UTRAN or RAN. When a pilot channel of a serving E-UTRAN is weaker than a threshold value and a pilot channel of another RAN, that typically indicates a desirability of a handoff.

In order to properly handoff the voice component to circuit switched network 130, communication system 100 provides for the infrastructure of communication system 100 to determine whether the UE being handed off is a single radio or multi-radio UE. In response to determining that the handover is a single radio handover, that is, an SRVCC (Single Radio Voice Call Continuity) handover, communication system 100 then selects a single radio MSC that supports the handoff of a single radio UE for the handoff of the UE.

Figure 4A:
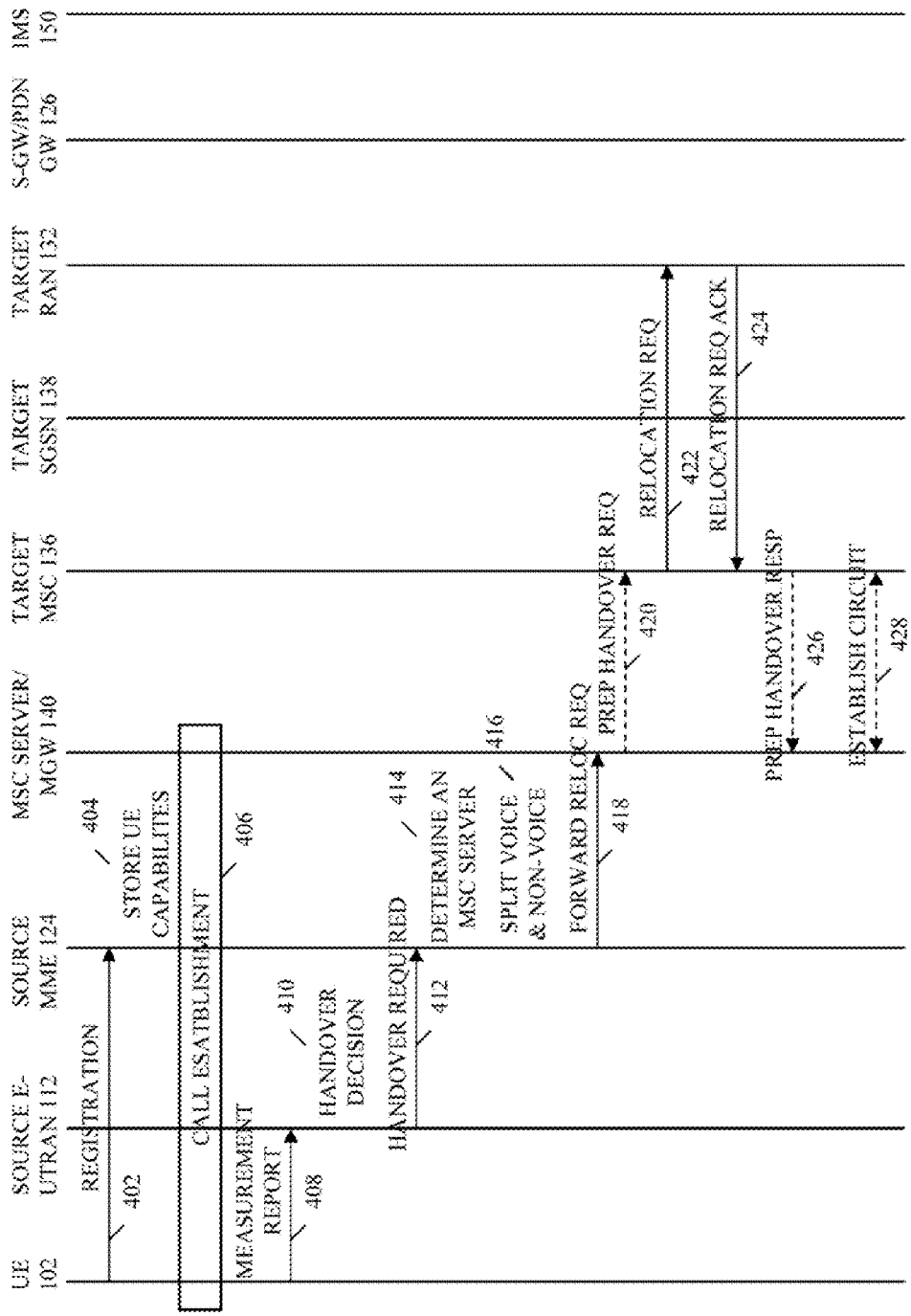
FIG. 4A is a signal flow diagram of a method executed by the communication system of FIG. 1 in handing off a call from an evolved packet data network of FIG. 1 to a circuit switched network of FIG. 1 in accordance with various embodiments of the present invention.
Figure 4B:
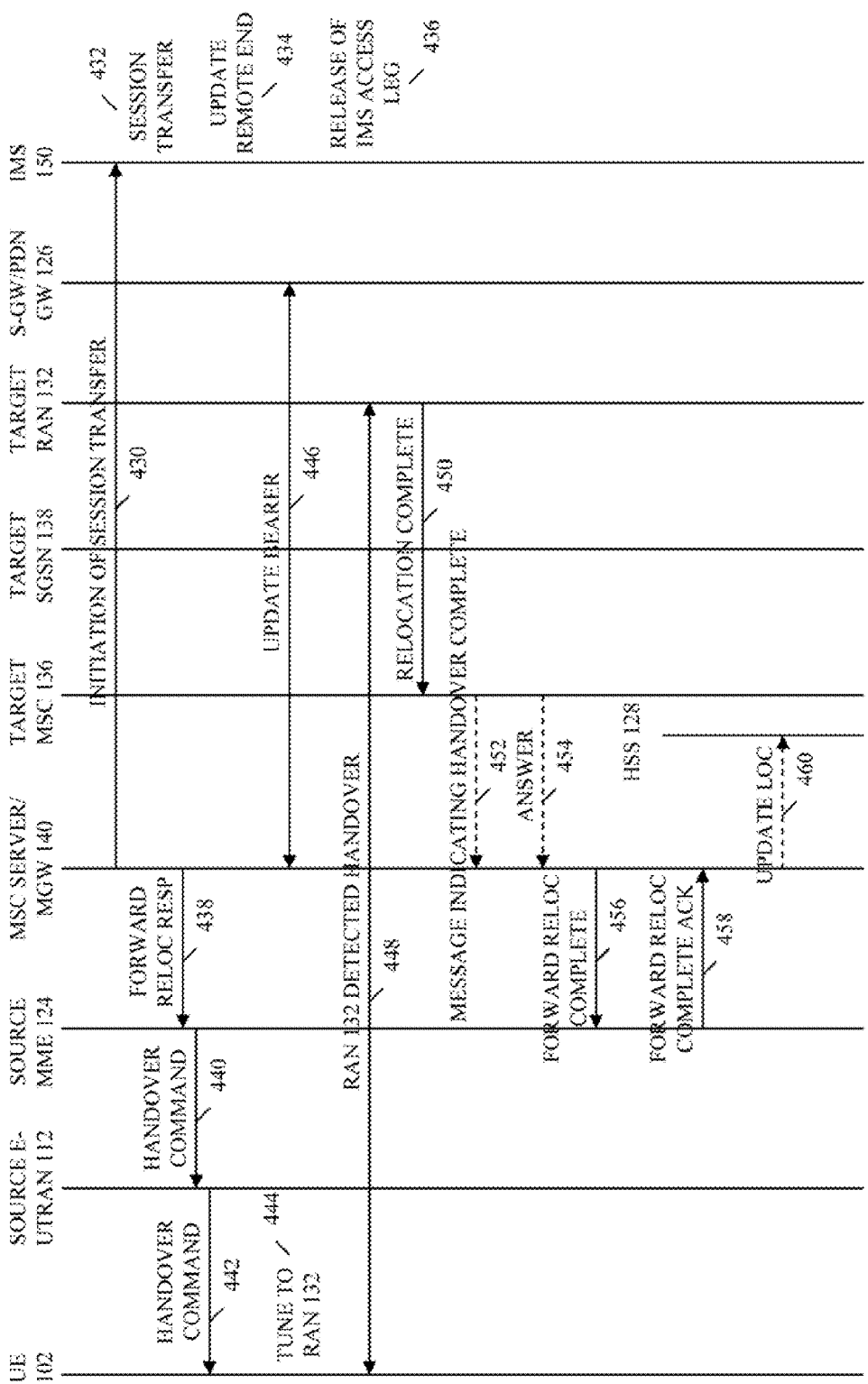
FIG. 4B is a continuation of the signal flow diagram of FIG. 4A depicting a method executed by the communication system of FIG. 1 in handing off a voice call from an evolved packet data network of FIG. 1 to a circuit switched network of FIG. 1 in accordance with various embodiments of the present invention.

Referring now to FIGS. 4A and 4B, a signal flow diagram 400 is provided that illustrates a method executed by communication system 100 in handing off UE 102 from an evolved packet data network 110 to circuit switched network 130 in accordance with various embodiments of the present invention. Signal flow diagram 400 begins when UE 102 registers (402) with MME 124. For example, the UE may activate in a coverage area of a RAN served by MME 124 or the UE may be handed off to a RAN served by MME 124. As part of the registration process, MME 124 obtains and stores (404) a profile of the UE that includes a UE identifier, such as an IMSI (International Mobile Subscriber Identity) or any other UE identifier known in the art, and information concerning the capabilities of the UE, such as whether the UE is a single radio UE or that operates in, or is capable of operating, in a single radio mode. For example, MME 124 may obtain this information from the UE as part of the registration process or the MME may retrieve this information from HSS 128 or from a Home Location Register (HLR) or a Visited Location Register (VLR) that maintains such information when the UE registers with the MME.

At some point in time, UE 102 establishes (406) a communication session with a source evolved packet data network, that is, packet data network 110, via a source RAN, that is, E-UTRAN 112, and that is controlled by IMS network 150, and in particular is anchored at VCC AS 154. The communication session includes a voice component, such as an IMS telephony session. When the communication session is set up, UE 102 is allocated a bearer path in packet data network 110 that includes one or more bearer channels in air interface 104 and one or more S1 bearer tunnels in S1 interface 116, including a voice bearer tunnel and a non-voice bearer tunnel if non-voice bearer data is involved, whereby voice data and non-voice data then are exchanged with the UE as part of the communication session. Further, as part of the set up of the communication session, the UE is assigned by network 110, preferably by E-UTRAN 112, a call-type identifier, preferably a QoS (Quality of Service) Class Identifier (QCI), that is associated with a voice call. Further, as part of the call set up, E-UTRAN 112 conveys the call-type identifier to MME 124 along with the UE identifier. MME 124 then stores the call-type identifier in association with the UE identifier. However, in another embodiment of the present invention, E-UTRAN 112 may convey the indicator to MME 124 as part of a handoff request conveyed to the MME as described below.

While UE 102 is engaged in the communication session via packet data network 110, the UE monitors qualities, in particular a signal strength or alternatively any of a variety of other signal qualities such as a signal-to-noise ratio (SNR), a carrier-to-interference ratio (C/I), pilot power-to-total power (Ec/Io) ratio, a bit error rate (BER), or a frame error rate (FER), of pilots associated with each of the serving RAN, that is, E-UTRAN 112 of packet data network 110, and one or more neighboring RANs, such as RAN 132 of circuit switched network 130. UE 102 may self-determine when or whether to monitor the pilots associated with RAN 132 of circuit switched network 130 or may monitor the pilots in response to receiving an instruction to do so from packet data network 110.

UE 102 reports (408) the monitored pilot(s) in accordance with well known reporting procedures. For example, when a quality of a pilot of circuit switched network 130, and more particularly of air interface 104, is measured by UE 102 when operating in packet data network 110 and exceeds an inter-system handoff threshold, or a quality of a previously reported pilot of packet data network 110, and more particularly of air interface 104, is measured by UE 102 when operating in packet data network 110 and falls below an intra-system handoff threshold, the UE may report the monitored pilot(s) back to E-UTRAN 112. The E-UTRAN then stores the reported pilot measurements.

Based on the pilot measurements associated with E-UTRAN 112 and RAN 132 and reported by UE 102, packet data network 110, and in particular E-UTRAN 112, determines (410) to handoff the communication session. For example, when a pilot of E-UTRAN 112 compares unfavorably to (is below, in the case of a signal strength threshold) the intra-system handoff threshold and/or a pilot of one or more measured RANs, such as RAN 132, compares favorably to (exceeds, in the case of a signal strength threshold) the inter-system handoff threshold, this may indicate a desirability of a handoff.

In response to determining to handoff the communication session, E-UTRAN 112 assembles a request to handoff the communication session that includes the measurements and that further identifies the UE to be handed off, that is, UE 102. The request further includes a handoff target identifier, such as an identifier of a target RAN, that is, RAN 132, or of a target cell, or target cell radio technology category associated with RAN 132, and, as noted above, may include a call-type indicator, such as a QCI, indicating that the communication session includes a voice component. E-UTRAN 112 then conveys (412) the handoff request to EPC 120, and in particular to MME 124.

Based on the target RAN or a target cell identifier and with reference to the configuration information maintained by MME 124, the MME determines (414) the MSC Server 140 and target MSC, that is, MSC 136, associated with the target RAN, that is, RAN 132. Further, based on the configuration information maintained for MSC 136 by MME 124, the MME determines that the UE is moving to a circuit switched network, that is, circuit switched network 130, and based on and the received identifier of UE 102, retrieves the UE capability information maintained by the MME or received by the MME from E-UTRAN 112, and further based on a call-type indicator for voice bearer, determines that the UE is invoking a SRVCC handoff procedure. More particularly, in response to receiving the request, MME 124 determines, based on the profile of the UE maintained by the MME, that UE 102 is a single radio UE or at least is capable of operating in a single radio mode. MME 124 further determines, based on the QCI associated with the communication session, that the communication session includes a voice component and, in light of the determination that UE 102 is a single radio UE and target MSC 136 supports circuit switched voice calls, that UE 102 is requesting, and therefore determines to implement, a SRVCC handoff procedure. MME 124 also determines, based on the configuration information maintained by the MME for MSC 136, that the MSC supports a SRVCC handoff procedure.

Based on the determination that the communication session includes a voice component, that this is an SRVCC handoff, and that MSC 136 supports SRVCC, if multimedia sessions are active in the UE 102 then the MME 124 splits (416) the routing of the voice component, or bearer, of the communication session from a routing of any non-voice component, or bearer, of the communication session in order to handoff only the voice component of the communication session to circuit switched network 130, and in particular to MSC 136 and RAN 132. If UE has the capability of simultaneously for voice and packet service in the target circuit switched network 130, MME 124 further may determine another RAN that is part of a packet data network for a handoff of any such non-voice component, for example, a video component, of the communication session. Otherwise, the non-voice component may be suspended.

MME 124 then requests (418) a handoff of the voice component of the communication session to circuit switched network 130, MSC 136, and RAN 132, and an allocation of resources to UE 102 in circuit switched network 130, preferably by conveying a Forward Relocation Request message to MSC Server/MGW 140. As is known in the art, the Forward Relocation Request message may comprise a relocation type, a cause, an identifier of UE 102, such as a Meaning Category Mobile Station Integrated Services Data Network (MSISDN), identifiers of source E-UTRAN 112 and target RAN 132, a Source to Target Transparent Container, a session transfer number, and mobility management (MM) context information. MME 124 may obtain the session transfer number and MSISDN from HSS 128 when UE 102 registers with, that is, attaches to, the MME and then stores the VDN and MSISDN in the UE's profile at the MME, or obtains session transfer number at the time of call establishment.

In response to receiving the handoff and resource allocation request from MME 124, MSC Server/MGW 140 conveys (420) a handoff and resource allocation request to target MSC 136. That is, MSC Server/MGW 140 interworks the packet data network handoff and resource allocation request received from MME 124 with a circuit switched network inter-MSC handoff request and conveys the circuit switched network inter-MSC handoff request, preferably a Prepare Handover Request message to target MSC 136. The Prepare Handover Request message identifies UE 102 and target RAN 132.

In response to receiving the handoff and resource allocation request from MSC Server/MGW 140, MSC 136 instructs (422) RAN 132 to allocate resources to UE 102 by conveying a Relocation Request message to the RAN. In response to receiving the Relocation Request message, RAN 132 allocates resources, such as radio access bearer (RAB) parameters, to UE 102 and acknowledges (424) the allocation of the resources and identifies the allocated resources by conveying a Relocation Request Acknowledgement message to MSC 136. In response to receiving the Relocation Request Acknowledgement message, MSC 136 conveys (426) a Handover Preparation Response message back to MSC Server/MGW 140 that identifies the resources allocated by RAN 132 and includes a handover number (HO#) for establishment of a circuit connection between the MSC 136 and MSC Server/MGW 140. Target MSC 136 and MSC Server/MGW 140 then allocate (428) resources for the handoff of UE 102, including establishing a circuit connection between the MSC and the MSC Server/MGW via an exchange of ISUP IAM (ISDN User Part Initial Address Message) and ISUP ACM (Address Complete Message) messages.

Further, in response to receiving the handoff and resource allocation request from MME 124, MSC Server/MGW 140 implements (430, 432, 434, 436) a transfer, by IMS network 150, of a downlink flow of voice packets from packet data network 110 to circuit switched network 130 in accordance with known techniques. More particularly, MSC Server/MGW 140 initiates (430) a transfer of the downlink flow of voice packets by IMS network 150 by conveying an ISUP IAM message, based on the session transfer number, to IMS network 150, and more particularly to VCC AS 154. The message includes an identifier associated with RAN 132, such as a target cell or sector identifier, the identifier of target MSC 136, and any Authentication, Authorization, and Accounting (AAA) information which is required to handover to circuit switched network 130. In response to receiving the transfer message from MSC Server/MGW 140, VCC AS 154 acknowledges an acceptance of the proposed transfer and establishes (432, 434) a circuit connection with target MSC 136 and, via the MSC, a connection to UE 102 via circuit switched network 130 in accordance with known techniques, for example, as specified by the 3GPP TS 23.292 and 23.237 specifications. IMS network 150 then transfers the downlink flow of voice packets from packet data network 110 to circuit switched network 130 and releases (436) a packet data network 110 leg of the downlink flow of voice packets.

In addition, in response to receiving the handoff request from MME 124 and allocating resources to the voice component of the communication session, MSC Server/MGW 140 informs (438) MME 124 of the voice component resource allocation by the MSC Server/MGW and of the resources allocated to the voice component by RAN 132 to UE 102, preferably by conveying a Forward Relocation Response message to the MME. MME 124 forwards (440) the voice component resource allocation information to E-UTRAN 112 and instructs E-UTRAN 112 to proceed with handoff of UE 102 to circuit switched network 130 and RAN 132 by conveying a first Handoff Command message to E-UTRAN 112. In turn, E-UTRAN 112 informs (442) UE 102 of the resources allocated by RAN 132 to the UE for the voice component of the communication session and instructs the UE to handoff to RAN 132, preferably by conveying a second Handoff Command message to the UE. In response to receiving the instruction to handoff to RAN 132, UE 102 tunes (444) to the identified radio bearer and accesses RAN 132, and in response to the access attempt, RAN 132 detects (448) UE 102 and acquires the UE in accordance with well-known techniques.

In addition, in response to receiving the Forward Relocation Response message from MSC Server/MGW 140, MME 124 arranges for updating (446) of the S1 user bearers established between E-UTRAN 112 and S-GW/PDN GW 126 in packet data network 110. More particularly, MME 124 exchanges Update Bearer Request messages with S-GW/PDN GW 126 that cause the S-GW/PDN GW to modify the S1 bearer tunnels between the S-GW/PDN GW and RAN 132, and more particularly to deactivate the voice bearer tunnel in S1 interface 116 while suspending all non-voice bearer tunnels in source network 110.

When target RAN 132 has completed acquisition of UE 102, the target RAN provides communication session-related services to the UE and informs (450) target MSC 136 of the successful acquisition of the UE, preferably by conveying a Relocation Complete message to the MSC. In response to receiving the Relocation Complete message, target MSC 136 informs (452) MSC Server/MGW 140 of the successful acquisition of UE 102 by circuit switched network 130 by conveying a message with a Handover Complete indication to the MSC Server/MGW. Target MSC 136 further completes establishment of a circuit connection with MSC Server/MGW 140 by conveying (454) an ISUP Answer message to the MSC Server/MGW, thereby completing a link for UE 102 through the MSC to the MSC Server/MGW.

In response to being informed of the successful acquisition of UE 102 by circuit switched network 130 and to the completion of the establishment of a circuit connection with target MSC 136, MSC Server/MGW 140 informs (456) MME 124 that UE 102 has arrived on the target side by conveying a Forward Relocation Complete message to the MME. MME 124 acknowledges (458) receiving this message by conveying a Forward Relocation Complete Acknowledgement back to the MSC Server/MGW. In addition, MSC Server/MGW 140 may update (460) a location of the MS maintained by HSS 128 or an HLR/VR by conveying a MAP Update Location message to the HSS and/or HLR/VLR. Signal flow diagram 400 then ends.

By determining that the communication session comprises a voice component based on a call-type identifier, preferably a QCI, that is associated with a voice call and determining that a UE is capable of operation in single radio mode based on a profile of the UE, and further determining that a target network is a circuit switched network based on configuration information maintained in association with the target network, communication system 100 is able to determine to implement a SRVCC handoff procedure without the need for an SRVCC indicator.

While the present invention has been particularly shown and described with reference to particular embodiments thereof, it will be understood by those skilled in the art that various changes may be made and equivalents substituted for elements thereof without departing from the scope of the invention as set forth in the IMS network below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the IMS network. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms 'including' and/or 'having', as used herein, are defined as comprising. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions. An element preceded by ". . . a" does not, without more constraints, preclude the existence of additional identical elements in the process, method, article, or apparatus.

What is claimed is:

1. A method for implementation of an inter-technology handoff of a communication session from a packet data network to a circuit switched network, the method comprising:
   storing user equipment capabilities in a Mobile Management Entity (MME);
   establishing, in the packet data network and with a user equipment, the communication session that comprises a voice component;
   determining by the packet data network, to hand off the communication session;
   in response to determining to hand off the communication session and based on a call-type identifier, determining by the MME, that the communication session comprises the voice component;
   determining by the MME, that a target network is the circuit switched network based on configuration information maintained in association with the target network;
   in response to determining that the communication session comprises the voice component, determining that the target network is the circuit switched network, and from the stored user equipment capabilities that the user equipment is capable of operation in single radio mode, determining to implement a Single Radio Voice Call Continuity (SRVCC) handoff procedure without the need for an SRVCC indicator; and
   requesting by the MME, the inter-technology handoff of the voice component of the communication session to the circuit switched network.

2. The method of claim 1, wherein the call-type identifier is a QoS Class Identifier.

3. The method of claim 1, further comprising:
   receiving the call-type identifier during set up of the communication session with the packet data network;
   storing the received call-type identifier; and
   wherein determining that the communication session comprises a voice component comprises determining that the communication session comprises a voice component based on the stored received call-type identifier.

4. The method of claim 1, further comprising:
   receiving the call-type identifier as part of a handoff request; and
   wherein determining that the communication session comprises a voice component comprises determining that the communication session comprises a voice component based on the received call-type identifier.

5. The method of claim 1, further comprising determining that a mobile switching center of the target network supports a Single Radio Voice Call Continuity handoff procedure based on configuration information maintained in association with the mobile switching center.

6. The method of claim 1, wherein the communication session comprises a voice component and a non-voice component and further comprising:
   determining to split the routing of the voice component and the non-voice component; and
   handing off only the voice component to the target network.

7. The method of claim 6, wherein handing off only the voice component to the circuit switched network comprises deactivating an S1 bearer tunnel in the packet switched network that is associated with the voice component.

8. The method of claim 6, wherein handing off only the voice component to the circuit switched network comprises deactivating an S1 bearer tunnel in the packet switched network associated with the voice component while maintaining an S1 bearer tunnel in the packet switched network associated with the non-voice component.

9. The method of claim 6, wherein handing off only the voice component to the circuit switched network comprises deactivating an S1 bearer tunnel in the packet switched network associated with the voice component while suspending the non-voice component in the source network.

10. A Mobile Management Entity (MME) that provides for inter-technology handoff of services from a packet data network to a circuit switched network, the MME comprising:
    an at least one memory device of the MME that maintains configuration information in association with the circuit switched network; and
    a processor of the MME that is configured to store on the at least one memory device user equipment capabilities, establish, in the packet data network and with a user equipment, a communication session that comprises a voice component, determine that the communication session comprises the voice component based on a call-type identifier, determine that a target network of a handoff of the user equipment is the circuit switched network based on the maintained configuration information, and in response to determining that the communication session comprises the voice component, determine that the target network is the circuit switched network, and from the stored user equipment capabilities that the user equipment is capable of operation in single radio mode, determine to implement a Single Radio Voice Call Continuity (SRVCC) handoff procedure without the need for an SRVCC indicator, and request the inter-technology handoff of the voice component of the communication session to the circuit switched network.

11. The MME of claim 10, wherein the call-type identifier is a QoS Class Identifier.

12. The MME of claim 10, wherein the processor is configured to receive the call-type identifier during set up of the communication session with the packet data network, store the received call-type identifier in the at least one memory device, and determine that the communication session comprises a voice component by determining that the communication session comprises a voice component based on the stored received call-type identifier.

13. The MME of claim 10, wherein the processor is configured to receive the call-type identifier as part of a handoff request and determine that the communication session comprises a voice component by determining that the communication session comprises a voice component based on the received call-type identifier.

14. The MME of claim 10, wherein the processor is configured to determine that a mobile switching center of the target network supports a Single Radio Voice Call Continuity handoff procedure based on the maintained configuration information.

15. The MME of claim 10, wherein the communication session comprises a voice component and a non-voice component and wherein the processor is configured to determine to split the routing of the voice component and the non-voice component and to handoff only the voice component to the target network.

16. The MME of claim 15, wherein the processor is configured to handoff only the voice component to the target network by deactivating an S1 bearer tunnel in the packet switched network that is associated with the voice component.

17. The MME of claim 15, wherein the processor is configured to hand off only the voice component to the circuit switched network by deactivating an S1 bearer tunnel in the packet switched network associated with the voice component while maintaining an S1 bearer tunnel in the packet switched network associated with the non-voice component.

18. The MME of claim 15, wherein the processor is configured to hand off only the voice component to the circuit switched network by deactivating an S1 bearer tunnel in the packet switched network associated with the voice component while suspending the non-voice component in the source network.

* * * * *